United States Patent [19]

Tucker

[11] Patent Number: 5,241,028
[45] Date of Patent: Aug. 31, 1993

[54] POLYMERIZING ETHYLENE-IONIC COMONOMER USING INVERSE MICELLAR PROCESS

[75] Inventor: Christopher J. Tucker, Bay City, Mich.

[73] Assignee: The Dow Chemical Company, Midland, Mich.

[21] Appl. No.: 891,497

[22] Filed: May 29, 1992

[51] Int. Cl.$^5$ .......................... C08F 2/04; C08F 2/06
[52] U.S. Cl. .................................. 526/277; 526/72; 526/78; 526/287; 526/318
[58] Field of Search ............ 526/72, 88, 78, 218.1, 526/213, 216, 227, 277, 287, 318

[56] References Cited

U.S. PATENT DOCUMENTS 3,297,663  1/1967  Hofheim .

*Primary Examiner*—Christopher Henderson

[57] ABSTRACT

Nonrandom ionomers of ethylene and an ionic functional comonomer, such as zinc-2-ethylhexylmaleate, are prepared in a one-step, inverse micellar copolymerization process comprising contacting under copolymerization conditions ethylene and the comonomer in a manner such that the comonomer forms an inverse micelle within the ethylene. The comonomer is at least 20% neutralized, preferably 100% neutralized. The ionomers of this invention exhibit properties similar to nonrandom ionomers made by the traditional two-step process of copolymerizing ethylene and an alpha,beta-ethylenically unsaturated carboxylic acid, and then neutralizing the product with metal ions.

10 Claims, 1 Drawing Sheet

WATER ABSORPTION DATA

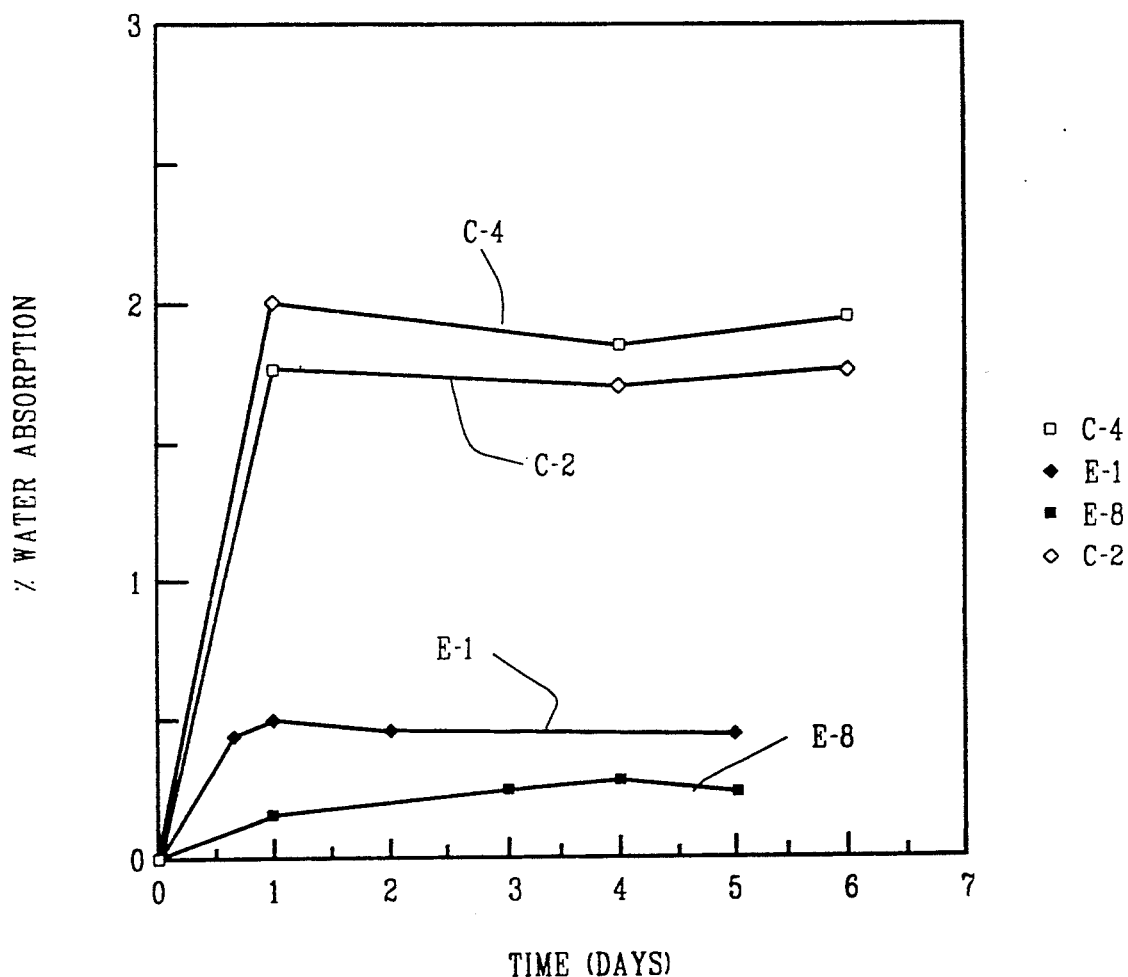
Figure

POLYMERIZING ETHYLENE-IONIC COMONOMER USING INVERSE MICELLAR PROCESS

BACKGROUND OF THE INVENTION

This invention relates to ionomers. In one aspect, this invention relates to ionomers prepared from ethylene and an ionic functional comonomer while in another aspect, this invention relates to ionomers prepared from comonomers that form inverse micelles in ethylene or a hydrocarbon solvent under copolymerization conditions. In yet another aspect, this invention relates to the process of preparing and to the products made from these ionomers.

Ionomers and various methods for their preparation are known in the art. U.S. Pat. Nos. 4,248,990 and 4,252,924 to Pieski et al. and Chatterjee, respectively, teach a two-step process. In the first step, ethylene and an alpha, betaethylenically unsaturated carboxylic acid, e.g. (meth)acrylic acid, are copolymerized. In the second step, 5 to 90% of the ionized groups are neutralized with metal ions having an ionized valence of from 1 to 3 inclusive. The metal ions can be complexed or uncomplexed.

EPO application 86,115,591.1 by Herwig et al. teaches the manufacture of nonrandom ionomers by a one-step process in which the ionic functional comonomer is partially or fully neutralized prior to copolymerization with the ethylene monomer. The copolymerization is conducted in a homogeneous solution created through the action of a polar solvent, such as dimethylformamide, tetrahydrofuran, or an alcohol.

SUMMARY OF THE INVENTION

According to this invention, nonrandom ionomers of ethylene and an ionic functional comonomer are prepared in a one-step, inverse micellar copolymerization process comprising contacting under copolymerization conditions ethylene and the comonomer in which the comonomer forms an inverse micelle within the ethylene. The comonomer is a compound that forms micelles in at least one of:
a. liquified ethylene and
b. a hydrocarbon or an inertly-substituted hydrocarbon solvent.

The comonomer is at least about 20% neutralized. The ionic comomoner is present at a concentration of less than about 10 mole % relative to the ethylene. The ionomers of this invention exhibit properties similar to nonrandom ionomers made by post-neutralization processes, but at a lower ionic content.

DESCRIPTION OF THE PREFERRED EMBODIMENTS

The ionic functional comonomers of this invention are comonomers that form inverse micelles in at least one of:
a. liquified ethylene, preferably at a pressure of at least about 60 Bar, more preferably at a pressure of at least about 600 Bar; and
b. a hydrocarbon solvent.

The hydrocarbon solvents include aliphatic, aromatic and inertly-substituted aliphatic and aromatic solvents, and are preferably alkyl, cycloalkyl, aryl, and arylalkyl solvents of 5 to 12 carbon atoms. Representative compounds include pentane, heptane, decane, cyclopentane, cycloheptane, norborane, benzene, toluene, ethylbenzene, and the like. By "inertly-substituted" is meant that the substituent to the aliphatic or aromatic solvent is essentially inert to the reaction reagents and products at reaction conditions. Representative inertly-substituted hydrocarbon solvents include the dicloro- and trichlorobenzenes. While the comonomers of this invention form micelles within these hydrocarbons solvents, these solvents are not necessary to the practice of the process of this invention.

Preferred comonomers are of the formula

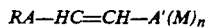

wherein
A and A' are independently ionic moieties;
R is a hydrocarbyl or an inertly-substituted hydrocarbyl radical of at least about 6 carbon atoms;
M is a cation with a valency of at least that of A'; and
n is an integer of 0 or 1.

By "independently" is meant that A and A' can be the same or different in any given comonomer. A and A' are typically carboxylate, sulfonate, sulfate, or phosphonate radicals, preferably carboxylate radicals. R is preferably an aliphatic radical, more preferably an alkyl radical such as an ethylhexyl or a methylheptyl radical. By "inertly-substituted" is meant that the substituent to the hydrocarbyl radical is essentially inert to the reaction reagents and products at reaction conditions. M is a mono-, di- or trivalent cation, either complexed or uncomplexed, and is typically an uncomplexed metal ion such as lithium, sodium, potassium, magnesium, calcium, zinc, copper or aluminum; preferably sodium, calcium, magnesium or zinc. If n is 0, then M is absent and the comonomer is unneutralized. If n is 1, then M is present and the comonomer is neutralized. If the valency of M is greater than the valency of A', then M will neutralize the valency of more than one comonomer.

The comonomers of this invention are preferably at least about 20%, more preferably at least about 70%, and most preferably at least about 90% neutralized. Especially preferred comonomers are 100% neutralized, and 100% zinc-neutralized 2-ethylhexylmaleate and 2-ethylhexylfumarate are particularly preferred comonomers.

The comonomer is contacted directly with the liquified ethylene, typically under high pressure (e.g., at least about 60 Bar, preferably at least about 600 Bar) or in the alternative, the comonomer is first dissolved in a solvent, e.g., heptane, and then contacted with the ethylene at high pressure. In either embodiment, the comonomer forms an inverse micelle, i.e., it exists as a discontinuous phase within a continuous phase of ethylene or ethylene and solvent, from which it copolymerizes with the ethylene to form an ionomer.

The mole ratio of ethylene to comonomer can vary to convenience, but is typically about 9 to 1, preferably about 99 to 1. If a hydrocarbon solvent is used, then it is present in an amount sufficent to solubilize the comonomer. While greater amounts of solvent can be used if desired, larger amounts are generally disfavored because not only does this mean that more solvent must be recovered, but it detracts from the overall efficiency of the process by requiring larger equipment and larger amounts of energy to produce the same amount and quality of product.

The temperature at which the process of this invention is conducted can vary to convenience, and is important only in its relationship to pressure. Typically the reaction temperature is at least about 60° C., preferably at least about 80° C., and more preferably at least about 170° C. The maximum reaction temperature typically does not exceed more than about 280° C., preferably not more than about 250° C.

In a preferred embodiment of this invention, a free radical initiator is used to promote the copolymerization of the ethylene and the comonomer. Any free radical initiator can be used, but peroxide initiators are typical with the selection of a particular initiator often dependent on the temperature of the polymerization reaction. Representative initiators include azo-bis-isobutyronitrile, di-t-butyl peroxide, t-butyl peroxy 2-ethylhexoate, t-butyl peroxy 3,5,5-trimethylhexoate t-butyl peracetate, and the like. The amount of initiator used can vary widely, but a typical minimum amount is about 0.05, preferably about 0.3, weight percent of the ethylene.

The reaction equipment needed to copolymerize the ethylene and comonomer can vary to convenience, but high pressure autoclaves and tubular reactors commonly used for the preparation of low density polyethylene or ethylene copolymers by way of free radical processes are typical. Extruders and low pressure equipment used to prepare high density or linear low density polyethylene are not well suited for the copolymerization of this invention and as such, are disfavored equipment.

The process and ionomers of this invention are more fully described by the following specific embodiments. Unless otherwise noted, all parts and percentages are by weight.

SPECIFIC EMBODIMENTS

Examples 1-13 and Controls 1-4

Batch Preparation of Ionomers

The ionomers of Examples 1-13, the polymer of Control 1, and the copolymer of Control 2 were prepared in a high pressure autoclave of 650 cc total volume separated into upper and lower chambers by a moveable piston. The upper chamber was equipped with a mechanical stirrer.

The autoclave was initially heated to run temperature with 10 ml of Shellsol ® T solvent (an inert, hydrocarbon solvent with a high boiling point composed of a mixture of paraffinic, naphthenic and aromatic hydrocarbons manufactured and sold by the Shell Chemical Company) in the lower chamber. The upper chamber (640 cc) was then pressurized with ethylene, and then charged with a mixture of heptane, comonomer (if any), and initiator. This charge caused a pressure drop due to the dissolution of ethylene into the heptane. Additional ethylene was then charged to the upper chamber to re-establish or exceed the pressure of the initial ethylene charge. The contents of the upper chamber were then pressurized to the run pressure by pumping additional Shellsol ® T solvent into the lower chamber (except in E-3 which was already at run pressure).

The contents of the upper chamber were continually stirred throughout the run time. After this period and for C-1, E-1 to E-7, E-12 and E-13, the lower chamber was drained to reduce pressure, the contents of the upper chamber recovered and passed through coarse filter paper to remove heptane, and dried in a vacuum oven at 170° C. for two hours. The product was then weighed, its average molecular weight determined, and then subjected to various chemical and physical property determinations.

For C-2 and E-8 to E-11, the run procedure was modified. The mixture of heptane, comonomer and initiator was charged to the upper chamber in a series of three steps. After the initial charge, pressurization and run segment, the lower chamber was drained to reduce the pressure of the upper chamber, additional mixture was charged to the upper chamber, and the contents of the upper chamber were repressurized by charging additional Shellsol ® T solvent to the lower chamber. This sequence was repeated and after the third run segment, the contents of the upper chamber were recovered and analyzed in the same manner as that of C-1, E-1 to E-7, E-12 and E-13. This procedure of multiple additions of comonomer and initiator minimizes the amount of compositional drift, and it keeps the amount of initiator in the upper chamber relatively constant throughout the run sequence.

The process parameters for these runs are reported in Table I. For C-2 and E-8 to E-11, the series of three numbers reported in the columns captioned "Heptane (ml)," "Comonomer (g)," "Init (g)," and "Time (hr)" report the amount of each component in each charge, and the length of each run segment, respectively.

The product of C-1 was polyethylene (due to the absence of a comonomer). The product of C-2 was poly(ethylene-co-2-ethylhexylfumaric acid) which was subsequently neutralized in conventional fashion with a zinc base. The product of E-1 to E-10 was poly(ethylene-co-zinc-2-ethylhezylfumarate), and the product of E-11 to E-13 was poly(ethylene-co-zinc-2-ethylhexyl-maleate).

TABLE I

| | | | | | | | | | | | |
|---|---|---|---|---|---|---|---|---|---|---|---|
| COPOLYMERIZATION BATCH PROCESS PARAMETERS | | | | | | | | | | | |
| Ex/ Ctrl | Heptane (ml) | Comonomer | Comonomer (g) | Initiator | Init. (g) | Pre-run Pressure[7] (Bar) | Run Pressure (Bar) | Temp. (°C.) | Time (hr) | Yield (g) | Zinc Co-monomer (wt %) |
| C-1 | 350 | — | — | AIBN[4] | 0.3 | 102 | 800 | 80 | 7 | 2.3 | 0 |
| C-2 | 300/50/50 | C8 Fum. Acid[1] | 1.5/1.0/1.0 | Octoate[5] | 0.2/0.2/0.2 | 60 | 900 | 87 | 3/2/3 | 7.8 | 0 |
| E-1 | 320 | Zn C8 Fum[2] | 2 | Octoate[5] | 0.4 | 61 | 900 | 65 | 25 | 4.6 | 15.73 |
| E-2 | 400 | Zn C8 Fum[2] | 8 | Octoate[5] | 0.5 | 116 | 1200 | 76 | 27 | 4.4 | 50.78 |
| E-3 | 500 | Zn C8 Fum[2] | 2.08 | AIBN | 1.0 | 60 | 60 | 70 | 23 | 6.8 | 0.8 |
| E-4 | 475 | Zn C8 Fum[2] | 1.5 | AIBN | 1.0 | 50 | 700 | 77 | 8 | 7.1 | 5.83 |
| E-5 | 475 | Zn C8 Fum[2] | 1.5 | AIBN | 0.3 | 46 | 750 | 81 | 8 | 16.1 | 2.71 |
| E-6 | 400 | Zn C8 Fum[2] | 2 | AIBN | 0.3 | 100 | 800 | 80 | 8 | 19.4 | 3.75 |
| E-7 | 400 | Zn C8 Fum[2] | 3 | AIBN | 0.3 | 90 | 800 | 80 | 8 | 8.2 | 9.02 |
| E-8 | 350/50/50 | Zn C8 Fum[2] | 1.5/1.0/1.0 | Octoate | 0.3/0.2/0.2 | 72 | 900 | 92 | 3/2/3 | 19.4 | 5.19 |
| E-9 | 300/50/50 | Zn C8 Fum[2] | 1.5/1.0/1.0 | Octoate | 0.2/0.2/0.2 | 68 | 900 | 88 | 3/2/3 | 8.8 | 8.54 |
| E-10 | 300/50/50 | Zn C8 Fum[2] | 1.5/1.0/1.0 | Octoate | 0.2/0.2/0.2 | 63 | 900 | 88 | 3/2/3 | 13.1 | 7.66 |
| E-11 | 300/50/50 | Zn C8 Mal[3] | 1.5/1.0/1.0 | Octoate | 0.2/0.2/0.2 | 63 | 900 | 89 | 3/2/3 | 19.1 | 9.82 |
| E-12 | 300 | Zn C8 Mal[3] | 2 | Nonoate[6] | 0.4 | 58 | 900 | 96 | 9 | 4.9 | 13.33 |

TABLE I-continued

COPOLYMERIZATION BATCH PROCESS PARAMETERS

| Ex/Ctrl | Heptane (ml) | Comonomer | Comonomer (g) | Initiator | Init. (g) | Pre-run Pressure[7] (Bar) | Run Pressure (Bar) | Temp. (°C.) | Time (hr) | Yield (g) | Zinc Co-monomer (wt %) |
|---|---|---|---|---|---|---|---|---|---|---|---|
| E-13 | 300 | Zn C8 Mal[3] | 2 | Nonoate[6] | 0.4 | 63 | 900 | 105 | 9 | 9.4 | 7.27 |

Footnotes to Table I:
[1] C8 Fum Acid = 2-Ethylhexylfumaric Acid
[2] Zn C8 Fum = Zinc 2-ethylhexylfumarate
[3] Zn C8 Mal = Zinc 2-ethylhexylmaleate
[4] AIBN = azo-bis-isobutylonitrite
[5] Octoate = t-Butyl peroxy 2-ethylhexoate
[6] Nonate = t-Butyl peroxy 3,4,5-trimethylhexoate
[7] Pre-run Pressure = Pressure of autoclave after charge sequence of ethylene, heptane-commoner-initiator mixture but before initiation of polymerization run.

Ionomer Testing

The complex viscosity and elastic modulus as a function of both frequency and percent strain at constant frequency and temperature were determined by dynamic mechanical spectroscopy for the ionomers made by the runs reported in Table I, as well as for two commercially available ionomers (C-3 and C-4). The results are reported in Tables II and III.

TABLE II

Complex Viscosity and Elastic Modulus v. Frequency

| Ex/Ctrl | Mw[3] | % Zn[4] | Temp (°C.) | Eta (100)* | Eta (10)* | Eta (1)* | Eta (0.1)* | $G^1$ (100)** | $G^1$ (10)** | $G^1$ (1)** | $G^1$ (0.1)** |
|---|---|---|---|---|---|---|---|---|---|---|---|
| C-2 | 4000 | 2.1 | 130 | 9 | 14 | 20 | 60 | 110 | 21 | 5 | 1 |
| C-3[1] | 3600 | 2.2 | 130 | 1050 | 1100 | 1050 | 1050 | 28,000 | 450 | 11 | — |
| C-4[2] | 5100 | 2.0 | 130 | 600 | 710 | 800 | — | 11,000 | 900 | 30 | — |
| E-1 | 5300 | 1.97 | 130 | 400 | 910 | 3100 | 9000 | 9500 | 3000 | 800 | 150 |
| E-11 | 3600 | 1.23 | 130 | 190 | 340 | 700 | 3000 | 2200 | 320 | 90 | 21 |
| E-9 | 3800 | 1.07 | 130 | 28 | 41 | 110 | 800 | 280 | 30 | 24 | 17 |
| E-8 | 3900 | 0.65 | 130 | 12 | 21 | 38 | 100 | 150 | 31 | 10 | 5 |
| E-1 | 5300 | 1.97 | 160 | 140 | 400 | 1100 | 4300 | 3800 | 1200 | 300 | 60 |
| E-11 | 3600 | 1.23 | 170 | 60 | 110 | 400 | 3900 | 820 | 17— | 60 | 40 |
| E-9 | 3800 | 1.07 | 170 | 19 | 30 | 100 | 700 | 200 | 50 | 21 | 20 |

Footnotes to Table II:
[1] C-3 = Aclyn 291A, an olefinic ionomer prepared by the copolymerization of ethylene and (meth)acrylic acid followed by partial neutralization with Zn O, and manufactured and sold by Allied Signal Inc.
[2] C-4 = Aclyn 295A, another olefinic ionomer prepared by the copolymerization of ethylene and (meth)acrylic acid followed by partial neutralization with Zn O, and manufactured and sold by Allied Signal Inc.
[3] MW = Weight average molecular weight. For C-2 and E-1, 8-9 and 11, Mw determined by gel permeation chromotography. For C-3 and 4, as reported by manufacturer.
[4] % Zn = For C-2 and E-1, 8-9 and 11, calculated by multiplying Zn comonomer (wt %) in Table I by 0.125. For C-3 and 4, as reported by manufacturer.
*Eta (x) = Complex viscosity at x rad/sec.
**$G^1$(x) = Elastic modulus at x rad/sec.

TABLE III

Complex Viscosity and Elastic Modulus v. % Strain

| Ex/Ctrl | Mw[3] | % Zn[4] | Temp (°C.) | Frequency (rad/sec) | Eta (100)* | Eta (10)* | Eta (1)* | Eta (0.1)* | $G^1$ (100)** | $G^1$ (10)** | $G^1$ (1)** | $G^1$ (0.1)** |
|---|---|---|---|---|---|---|---|---|---|---|---|---|
| C-2 | 4000 | 2.1 | 130 | 10 | 11 | 12 | — | — | 110 | 150 | — | — |
| C-3[1] | 3600 | 2.2 | 130 | 10 | 1100 | 1100 | 1100 | 1200 | 700 | 650 | 870 | — |
| C-4[2] | 5100 | 2 | 130 | 1 | 290 | 300 | 280 | 300 | — | — | — | — |
| E-1 | 5300 | 1.97 | 130 | 10 | 1100 | 1800 | 3000 | 10,000 | 4000 | 5100 | 6000 | 60,000 |
| E-8 | 3900 | 0.65 | 130 | 10 | 20 | 50 | 90 | — | 200 | 500 | 900 | — |
| E-6 | 6100 | 0.47 | 130 | 10 | 30 | 40 | 73 | — | — | — | — | — |
| E-8 | 3900 | 0.65 | 120 | 10 | 60 | 120 | 400 | — | 100 | 610 | 3100 | — |

Footnotes to Table III:
[1] C-3 = Aclyn 291A, an olefinic ionomer prepared by the copolymerization of ethylene and (meth)acrylic acid followed by partial neutralization with Zn O, and manufactured and sold by Allied Signal Inc.
[2] C-4 = Aclyn 295A, another olefinic ionomer prepared by the copolymerization of ethylene and (meth)acrylic acid followed by partial neutralization with Zn O, and manufactured and sold by Allied Signal Inc.
[3] MW = Weight average molecular weight. For C-2 and E-1, 6 and 8, Mw determined by gel permeation chromotography. For C-3 and 4, as reported by manufacturer.
[4] % Zn = For C-2 and E-1, 6 and 8, calculated by multiplying Zn comonomer (wt %) in Table I by 0.125. For C-3 and 4, as reported by manufacturer.
*Eta (x) = Complex viscosity at x rad/sec.
**$G^1$(x) = Elastic modulus at x rad/sec.

In Table II, a comparison of the C-2 and E-1 ionomers demonstrates that the complex viscosity and elastic modulus of an ionomer prepared by this invention is 50 to 150 times greater at all frequencies than an ionomer of nearly identical chemical composition but prepared by a traditional two-step process. This implies that a greater amount of ionic crosslinking occurs in the ionomers prepared by inverse micelle copolymerization, and this in turn results in a greater viscosity. Moreover, the complex viscosity and elastic modulus numbers for the post-neutralized ionomer (C-2) are similar to those obtained for E-8 which contains less than one third the level olefinic groups. This implies that ionomers made by the inverse micelle technique will exhibit properties similar to ionomers made by the post-neutralization technique but at lower ionic content.

Comparing the data for the ionomer made in E-1 to the commercial resin AClyn 295A (C-4) shows a greater shear dependence for the inverse micelle prepared ionomer. This implies that the E-1 ionomer contains shear reversible ionic crosslinking at temperatures up to 170° C. while the AClyn 295A ionomer has already lost its shear sensitivity at 110° C. This difference can be important in viscosity control applications.

Comparing the data E-1, 11, 9 and 8 suggests that as the Zn content decreases, the complex viscosity and elastic modulus v. frequency properties return to the level of the C-2 control, both at 130° and 160°/170° C.

Table IV reports the reaction conditions, process results and selected product properties. No comonomer was used in C-5 and thus the product was polyethylene. The comonomer in E-14 and E-15 was zinc mono(2-ethylhexyl) maleate to which one of two solvents was added to reduce its viscosity and thus improve its pumpability. In E-16, the comonomer was a terpolymer of ethylene, methylacrylate, and zinc mono-(2-ethylhexyl)maleate.

In all the examples, the addition of the ionic monomer resulted in a sharp decrease in melt index due to ionic crosslinking.

TABLE IV

| Ex/Ctrl | COPOLYMERIZATION CONTINUOUS PROCESS DATA ||||||||
| | Heptane Consumed (kg/h) | Comonomer Consumed (g/h) | Consumed (g/h) | MAcyl[4] Consumed (g/h) | Initiator[5] Consumed (g/h) | Heptane Yield (kg/h) | Copolymer Ionic Comonomer (mile %) | Melt Index |
| --- | --- | --- | --- | --- | --- | --- | --- | --- |
| C-5 | 13 | 0 | 0 | 0.19 | 4.5 | 1 | 0 | 150 |
| E-14 | 13 | 63[1] | 0 | 0.9 | 2.3 | 1.1 | 0.33 | 8 |
| E-15 | 14 | 100[2] | 0 | 0.33 | 2.5 | 1.1 | 0.62 | 5 |
| E-16 | 14 | 110[3] | 620 | 0.86 | 1.9 | 1.2 | 0.65 | 12 |

Footnotes for Table IV:
[1] Added as 18.2 wt % in heptane solution.
[2] Added as 28 wt % in methanol solution.
[3] Added as 15 wt % in methylacrylate solution.
[4] MAcyl = Methylacrylate
[5] Initiator = t-Butyl perivalate The data of Table III shows that the complex viscosity and elastic modulus of the E-1 ionomer change by a factor of 10 in moving from 0.1 to 100% strain, while the dynamic mechanical properties of the post-neutralized ionomer (C-2) do not show any strain dependence. This is evidence of the presence of phase separated ionic clusters in the ionomers of E-1, 6 and 8, and this suggests that the ionomers of this invention will demonstrate better film and film blowing properties, and better optics, than ionomers made by the conventional two-step process.

The FIGURE shows the water absorption vs. time property for two inverse micelle ionomers (E-1 and E-8) and two post-neutralization ionomers (C-2 and C-4). The ionomers were placed in water heated to and maintained at 90° C. Comparison of the saturated water content shows that the ionomer prepared by the inverse micelle technique contained more than three times as much water as the post-neutralized ionomers. This difference, as well as the differences in the dynamic mechanical properties can be explained by the presence of a more blocky structure in the ionomers prepared by the process of this invention.

These relatively low molecular weight ionomers are useful as flow promoters, hot melt adhesives, color concentrate dispersion aids, polymer blend compatibilizers, and as nucleating agents. Higher molecular weight analogues, e.g., analogues with a weight average molecular weight of at least about 20,000, are useful in packaging applications, covers for sporting equipment, automotive applications, foam sheet applications, and plastic films.

Examples 14–6 and Control 5

Continuous Preparation of Ionomers

The ionomers and ethylene polymer of these examples and C-5, respectively, were prepared in a continuous autoclave type reactor with an internal volume of 900 ml. The average residence time of the reactants was 50 seconds, and the autoclave temperature and pressure were maintained at 187° C. and 1800 Bar, respectively.

Although the invention has been described in considerable detail through the preceding examples and controls, this detail is for the purpose of illustration only and it is not to be construed as a limitation upon the spirit and scope of the following claims.

What is claimed is:

1. A one-step, inverse micellar solution copolymerization process for preparing nonrandom ionomers from
   A. ethylene, and
   B. an ionic functional comonomer that is at least about 20% neutralized and is of the formula $RA-HC=CH-A'(M)_n$ wherein
   A and A' are independently a sulfonate, sulfate, carboxylate or phosphonate radical;
   R is a hydrocarbyl or an inertly-substituted hydrocarbyl radical of at least 6 carbon atoms;
   M is a cation with a valency of at least that of A'; and
   n is an integer of 0 or 1,
   the process comprising contacting under copolymerizing conditions the ethylene and comonomer in such a manner that the comonomer forms an inverse micelle within the ethylene, and the comonomer is present in a concentration of less than about 10 mole % relative to the ethylene.

2. The process of claim 1 wherein R is an aliphatic radical of at least 8 carbon atoms.

3. The process of claim 2 wherein M is at least one of zinc, sodium, calcium and magnesium.

4. The process of claim 3 in which the comonomer is at least 70% neutralized.

5. The process of claim 3 in which the comonomer is essentially 100% neutralized.

6. The process of claim 4 in which the comonomer is present in a concentration less than about 1 mole percent relative to the ethylene.

7. The process of claim 6 in which the copolymerizing conditions include a temperature of at least about 60° C., a pressure of at least about 60 Bar, and a contact time of at least about 10 seconds.

8. The process of claim 7 in which the comonomer is dissolved in a solvent.

9. The process of claim 8 in which the inverse micellar solution contains an initiating amount of a free radical initiator.

10. The process of claim 9 in which the comonomer is selected from the group consisting of zinc 2-ethylhexylmaleate and zinc 2-ethylhexylfumarate.

* * * * *